United States Patent
Iida

(10) Patent No.: US 6,640,754 B1
(45) Date of Patent: Nov. 4, 2003

(54) IGNITION TIMING SYSTEM FOR HOMOGENEOUS CHARGE COMPRESSION ENGINE

(75) Inventor: Minoru Iida, Madison, WI (US)

(73) Assignee: Yamaha Hatsudoki Kabushiki Kaisha, Shizuoka-Ken (JP)

(*) Notice: Subject to any disclaimer, the term of this patent is extended or adjusted under 35 U.S.C. 154(b) by 0 days.

(21) Appl. No.: 09/661,762

(22) Filed: Sep. 14, 2000

(51) Int. Cl.[7] .............................. F02B 1/12; F02B 1/14
(52) U.S. Cl. ..................................................... 123/27 R
(58) Field of Search ............................... 123/27 R, 305

(56) References Cited

U.S. PATENT DOCUMENTS

| | | | |
|---|---|---|---|
| 5,261,236 A | * 11/1993 | Ironside et al. | 60/600 |
| 5,476,072 A | 12/1995 | Guy | 123/48 AA |
| 5,535,716 A | 7/1996 | Sato et al. | 123/279 |
| 5,740,775 A | 4/1998 | Suzuki et al. | 123/299 |
| 5,832,880 A | 11/1998 | Dickey | 123/25 C |
| 5,875,743 A | 3/1999 | Dickey | 123/25 C |
| 6,032,617 A | 3/2000 | Willi et al. | 123/27 GE |
| 6,095,102 A | 8/2000 | Willi et al. | 123/27 GE |
| 6,105,550 A | * 8/2000 | Nieberding | 123/294 |
| 6,286,482 B1 | * 9/2001 | Flynn et al. | 123/435 |
| 6,378,489 B1 | 4/2002 | Stanglmaier et al. | 123/304 |
| 6,390,054 B1 | 5/2002 | Yang | 123/295 |
| 6,443,104 B1 | 9/2002 | Simescu et al. | 123/25 J |
| 6,463,907 B1 | 10/2002 | Hiltner | 123/304 |

OTHER PUBLICATIONS

Thring R. H., Homogeneous–Charge Compression–Ignition (HCCI) Engines, Sep. 27, 1989, pp. 1–9.

"A Multi–Zone Model for Prediction of HCCI Combustion and Emissions", Aceves et al., SAE Technical Paper Series, 2000–01–0327, Mar. 6–9, 2000, 13pp.

"Auto–Ignition and Combustion of n–Buane and DME/Air Misture in a Homogenous Charge Compression Ignition Engine", Iida et al., SAE Technical Paper Series, 2000–01–1832, Jun. 19–22, 2000, 11pp.

"Homogenous Charge Compresssion Ignition (HCCI): Benefits, Compromises, and Future Engine Applications", Stanglmaier et al., SAE Technical Paper Series, 1999–01–3682, Oct. 25–28, 1999, 10pp.

* cited by examiner

Primary Examiner—Andrew M. Dolinar
(74) Attorney, Agent, or Firm—Knobbe, Martens, Olson & Bear, LLP

(57) ABSTRACT

A method for controlling the start of combustion in an homogeneous charge compression engine includes forming an substantially homogeneous air/fuel charge. At least the air of the air/fuel charge is introduced into the combustion chamber through an intake port. When the air/fuel charge auto-ignites is controlled by adjusting the pressure differential between the intake port and the combustion chamber when the intake passage is in communication with the combustion chamber. The air/fuel charge is compressed and the air/fuel charge is auto-ignited due to the compression of the air/fuel charge.

75 Claims, 9 Drawing Sheets

IGNITION TIMING SYSTEM FOR HOMOGENEOUS CHARGE COMPRESSION ENGINE

BACKGROUND OF THE INVENTION

1. Field of the Invention

The present invention relates to an apparatus and method for controlling the start of combustion in an compression engine, and more particularly to an apparatus and method for controlling the start of combustion in an homogeneous charge compression engine by controlling the pressure differential across an intake valve.

2. Description of the Related Art

Homogenous charge compression ignition (HCCI) engines are an attractive alternative to conventional diesel or spark ignited engines because of their potential for producing low NOx and particulate emissions as well as their high thermal efficiency. Combustion is typically achieved in an HCCI engine by compressing a substantially homogeneous intake air/fuel charge until it auto-ignites. The combustion of the substantially homogeneous intake charge is typically characterized by generally uniform, low-temperature, fuel-lean reactions.

One of the principal challenges of HCCI engines is how to control the start of combustion during a given intake cycle. In spark-ignition and diesel engines, the start of combustion is directly controlled. For example, in a spark-ignition engine, the start of combustion is controlled by the sparking of the spark plug. In a diesel engine, the start of ignition is controlled by the beginning of fuel injection. In an HCCI engine, however, the intake charge auto-ignites and, thus, there is no direct control of the start of combustion. Instead, the start of combustion is determined by the auto-ignition chemistry of the intake charge and the temperature and pressure of the intake charge near top-dead-center (TDC) of the compression stroke.

Several approaches for controlling the start of combustion in a HCCI engine have been suggested. For example, it has been suggested that the start of combustion can be controlled by varying the properties of the fuel and/or the air/fuel ratio. This method relies on adjusting the reactivity of the intake charge. Accordingly, the start of combustion can be advanced by increasing the reactivity of the intake charge and the start of combustion can be delayed by decreasing the reactivity of the intake charge.

It has also been suggested that the start of combustion can be controlled by adjusting the intake air temperature. Increasing the intake air temperature tends to increase the temperature of the intake charge near top-dead-center. This tends to advance the start of combustion. Similarly, decreasing the intake air temperature tends to delay the start of combustion.

However, to date, these methods for controlling the start of combustion in HCCI engines have been largely unsatisfactory. Accordingly, a need exists for an improved method of controlling the start of combustion in an HCCI engine.

SUMMARY OF THE INVENTION

One aspect of the present invention is the recognition that the start of combustion in an HCCI engine can be controlled by controlling the pressure differential between intake valve port and the combustion chamber when the intake passage is in communication with the combustion chamber (i.e., when the intake valve lifts away from the intake valve port).

Specifically, an aspect of the invention involves the recognition that by increasing the pressure differential across the intake valve the enthalpy and kinetic energy of the intake charge in the combustion chamber can be increased.

As the kinetic energy dissipates, the temperature of the intake charge increases during the compression stroke. This results in increased temperatures around top-dead-center of the compression stroke. Moreover, the start of combustion in a HCCI engine depends mainly upon the temperature of the intake charge around top-dead-center of the compression stroke. Accordingly, the start of combustion can be controlled by controlling the pressure differential across the intake valve.

Accordingly, another aspect of the present invention involves a method for operating an internal combustion engine. The engine includes at least one combustion chamber formed by at least a first member and a second member that moves relative to the first member. The second member is coupled to an output shaft such that movement of the second member causes the output shaft to rotate. An intake port is in communication with the combustion chamber and an intake passage. The intake port and is opened and closed by an intake valve that is actuated by a valve actuating system. A fuel supply system and air supply system are configured to provide a substantially homogeneous air/fuel charge to the combustion chamber. A control system configured to control the valve actuating system. A substantially homogenous air/fuel charge is formed. At least the air of the air/fuel charge is introduced into the combustion chamber through the intake port. When the air/fuel charge auto-ignites is controlled by adjusting a pressure differential between the intake port and the combustion chamber when the intake passage is in communication with the combustion chamber. The air/fuel charge is compressed and auto-ignited due to the compression of the air/fuel charge.

Another aspect of the invention involves an internal combustion engine that includes at least one combustion chamber formed by at least a first member and a second member that moves relative to the first member. The second member is coupled to an output shaft such that movement of the second member causes the output shaft to rotate. An intake port is in communication with the combustion chamber and is opened and closed by an intake valve that is actuated by a valve actuating system. A fuel supply system and air supply system are configured to provide a substantially homogeneous air/fuel charge, which comprises mixed air and fuel, to the combustion chamber. A control system is configured to control the valve actuating system. The engine further includes means for controlling when the air/fuel charge auto-ignites due to compression of the air/fuel charge in the combustion chamber.

Yet, another aspect of the present invention involves an internal combustion engine comprising of at least one combustion chamber formed by at least a first member and a second member that moves relative to the first member. The second member is coupled to an output shaft such that movement of the second member causes the output shaft to rotate. An intake port is in communication with the combustion chamber and an intake passage. The intake port is opened and closed by an intake valve that is actuated by a valve actuating system. A fuel supply system and air supply system are configured to provide a substantially homogeneous air/fuel charge, which comprises mixed fuel and air, to the combustion chamber through the intake port. A control system is configured to control the valve actuating system and is furthered configured to control when the air/fuel charge auto-ignites by adjusting a pressure differential between the intake port and the combustion chamber when the intake passage is in communication with the combustion chamber.

All of these embodiments are intended to be within the scope of the invention.

BRIEF DESCRIPTION OF THE DRAWINGS

These and other features of the invention will now be described with reference to the drawings of a prior combustion chamber design and of preferred embodiments, which are intended to illustrate and not to limit the invention. The drawings contain the following figures.

DETAILED DESCRIPTION OF THE PREFERRED EMBODIMENTS

Figure 1:
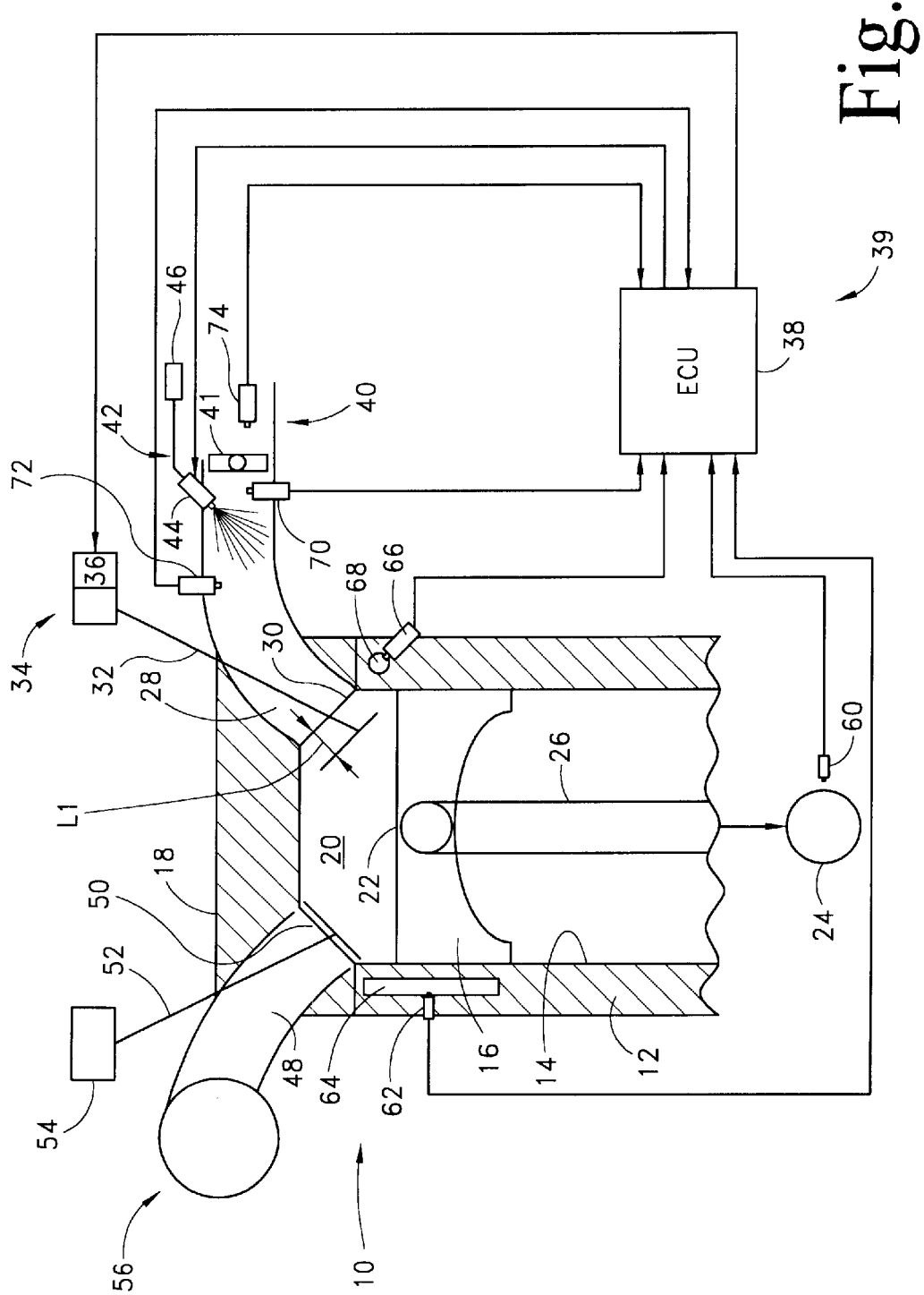
FIG. 1 is a schematic representation of one arrangement of an engine having certain features and advantages according to the present invention.

FIG. 1 is a schematic illustration of an arrangement of a homogeneous charge compression engine (HCCI) 10 having certain features and advantages according to the present invention.

The engine 10 includes a cylinder block 12. The cylinder block defines one or more cylinder bores 14, which can be laid out in any desired pattern (e.g., v-type, opposed, etc.). A corresponding number of pistons 16 reciprocate within the cylinder bores 14. A cylinder head 18 is affixed in a known manner to the cylinder block 12. A combustion chamber 20 is defined by the a top surface 22 of the piston 16, the cylinder bore 14 and a corresponding recess in the cylinder head 18. An output shaft 24 (e.g., a crankshaft) is connected to the pistons 16 by a connecting rod 26 and rotates with reciprocal movement of the pistons 16 within the cylinder bores 14. In the illustrated embodiment, the top surface 22 of the piston 16 is substantially flat. However, it should be appreciated that the top surface 22 can be of any shape such as, for example, recessed or bowled.

The engine 10 also includes at least one intake passage 28, which, in the illustrated arrangement is defined by the cylinder head 18. The intake passage 28 communicates with the combustion chamber 20 through an intake valve port 30 located on the recess that forms a portion of the combustion chamber 20. An intake valve 32, which is suitably journalled for movement, opens and closes the intake passage 28.

A valve actuator mechanism 34 actuates the intake valve 32 to open and close the intake valve port 30. A variable valve timing and/or lift (VVT) mechanism 36 adjusts the timing of the opening and closing of the intake valve (i.e., valve timing) and/or the amount of valve lift L1. Preferably, the VVT mechanism 36 is controlled by an electronic control unit (ECU) 38. The ECU 38 and the VVT mechanism 36 form part of an engine control system 39. The engine control system 39, including the ECU 38, will be described in more detail below.

The valve actuating mechanism 34 and the VVT mechanism 36 can be of any known type. For example, the valve actuator mechanism 34 can be formed by an electronically activated solenoid valve that directly or indirectly opens and closes the intake valve 32. In a modified arrangement, the intake valve 32 can be opened by an pneumatic or hydraulic mechanism. The VVT mechanism, in such arrangements, can be formed by control signals generated by the ECU 38. In another arrangement, the valve actuator mechanism 34 can be formed by a camshaft and follower mechanism. The VVT mechanism 36, in such an arrangement, can be formed by a variable cam mechanism.

An induction system, which is shown partially and indicated by the reference number 40, supplies an intake charge to the intake passages 28. The induction system 40 may also be of any known type. The induction system 40 preferably includes a throttle valve 41 of any known type for controlling the flow of intake air through the induction system 40.

The engine 10 also includes a fuel system that is indicated generally by the reference number 42. The fuel system 42 is configured to supply a substantially homogeneous fuel and air mixture to the combustion chamber 20. There are several ways of supplying a substantially homogeneous mixture to the combustion chamber 20 that are consistent with the present invention. In the illustrated arrangement, the fuel supply system 42 includes a fuel injector 44 that injects fuel into the induction system 40 upstream of the intake passage 28. It, however, should be appreciated that the fuel injector 44 can be located in the intake passage giving due consideration to the goal of supplying a substantially homogeneous intake charge to the combustion chamber 20. The fuel injector 44 also can be configured to direct fuel directly into the combustion chamber provided that the fuel injector is configured to provide a substantially homogeneous charge near top-dead-center of the compression stroke. This can be accomplished by injecting the fuel into the combustion chamber 20 early such that the fuel has time to mix with the intake air. It should also be appreciated that fuel system 42 can include more than one injector 44. Moreover, the injector 44 also can be an air/fuel injector. Of course, those of skill in the art will also recognize other methods for supplying a substantially homogeneous intake charge to the combustion chamber that are also consistent with the present invention.

The fuel injector 44 receives fuel from any suitable fuel supply system 46. The upstream fuel supply system 46 typically includes low and high pressure fuel pumps, vapor and water separators and a fuel supply tank. To control the amount of fuel injected into the induction system 40, an actuator (not shown), such as, for example, a solenoid valve, opens and closes the injector in response to control signals from generated by the ECU 38.

After the air/fuel charge ignites, it burns and expands to drive the piston 16 downwardly. Exhaust gases are expelled from the combustion chamber 20 through at least one exhaust passage 48 that is formed in the cylinder head 18 as illustrated in FIG. 1. The exhaust passage 48 extends from an exhaust seat 50 formed on the cylinder head 18 recess that forms part of the combustion chamber 20. An exhaust valve 52, which is suitably journalled for movement, opens and closes the exhaust passage 48. The exhaust valve 52 is opened and closed by an exhaust valve actuating mechanism 54, which may be of any known type, such as, for example, but without limitation, a camshaft and follower mechanism or an electronically activated solenoid valve. An exhaust manifold 56 collects the exhaust gases from the exhaust passage 48 and discharges them into an exhaust system (not shown) for eventual discharge to the atmosphere.

The engine control system 39 will now be described. The engine control system includes the ECU 38 and the various sensors and actuators that are operatively connected to the ECU 38. The ECU 38 can be in the form of a hard wired feed back control circuit. The ECU 38 also can be constructed of a dedicated processor and a memory for storing a computer program. In yet another arrangement, the ECU 38 can be a general purpose computer having a general purpose processor and memory for storing a computer program. It should also be noted that although the ignition timing system is described as being part of the engine control system, the ignition timing system can also be arranged so as to be separated completely or partially from the engine control system 39.

The engine control system 39 controls various engine operations. Preferably, one of the engine operations that the engine control system 39 controls is the ignition timing of the engine 10 (i.e., the timing of the start of combustion for a particular cycle). Accordingly, the engine control system 39 preferably includes a subsystem (i.e., the ignition control system) for controlling the ignition timing of the engine 10. The ignition timing system includes the ECU 38 and the VVT mechanism 36 described above. Preferably, the ignition timing system is a subsystem of the engine control system 39; however, it should be appreciated that the ignition timing system could also be a control system that is separated totally or partially from the engine control system 39.

The ignition control system preferably includes various engine sensors. As will be described in more detail below, these sensors are used by the ignition control system to more accurately control the ignition timing of the engine 10 in response to the various ambient and engine operating conditions. Some of the more important sensors for the ignition control system will now be described. It should be appreciated that the ignition control system need not include all the sensors described below. Moreover, it should be appreciated that the ignition control system also need not be limited to the sensors described below.

With continued reference to FIG. 1, there is provided, associated with the output shaft 24, a output shaft angle position sensor 60. The output shaft position sensor 60 defines a pulse generator that produces pulses as the output shaft 24 rotates. The pulses are, in turn, converted to an engine speed within the ECU 38 or another separate converter (not shown) by measuring output shaft angle versus time.

A water temperature sensor 62 communicates with a water cooling jacket 64 located within the cylinder block 12 of the engine 10. The water cooling jacket 64 is connected to a cooling system (not shown) and cools various parts of the engine 10 as is well known in the art. The water temperature sensor 62 senses the temperature of water flowing through the water jacket 64 and delivers a water temperature signal to the ECU 38.

A lubrication temperature sensor 66 communicates with lubrication gallery 68 that is located within the cylinder block 12 of the engine 10. The lubrication gallery 68 is connected to a lubrication system (not shown) and provides lubricant to various parts of the engine 10 as is well known in the art. The lubrication temperature sensor 66 senses the temperature of lubricant flowing through the gallery 68 and delivers a lubricant temperature signal to the ECU 38.

An air pressure sensor 70 communicates with the induction system 40. The air pressure sensor 70 is configured to sense the pressure of the intake air within the induction system 40 and to output an air pressure signal to the ECU 38. An intake air temperature sensor 72 also communicates with the induction system 40 for sensing the temperature of the intake air within the induction system 40. It should be noted that in a modified arrangement the air pressure sensor 70 and/or the air temperature sensor 72 can communicate with the intake passage 28.

The ignition control system also preferably includes a throttle position sensor 74, which is configured to sense the position of the intake air throttle 41. A signal, which is an indication of the position of the throttle valve 41, is sent by the throttle position sensor 74 to the ECU 38. The position of the throttle valve 41 can be used along with the engine speed to determine the engine load, as is well known in the art.

The ignition control system having certain features and advantages according to the present invention will now be described in detail. As mentioned above, one aspect of the present invention is that the ignition timing is controlled by adjusting the pressure differential across the intake valve 32 when the intake passage 28 is in communication with the combustion chamber 20 (i.e., when the intake valve 32 lifts away from the intake valve port 30). By increasing the pressure differential across the intake valve 32 (i.e., the pressure differential between the intake valve port 30 and the combustion chamber 20), the enthalpy and kinetic energy of the intake charge in the combustion chamber can be increased. This increase in enthalpy can be explained by the equation below:

$$\frac{D}{Dt}\left(h + \frac{1}{2}u^2\right) = \frac{1}{\rho}\frac{\partial p}{\partial t}$$

where
D/Dt=The Eulerian Derivative
h=enthalpy
u=velocity of the fluid
p=pressure of the fluid and heat addition and the work of volume forces are considered negligible As the kinetic energy dissipates, the temperature of the intake charge increases around top-dead-center (TDC) of the compression stroke. Increasing the temperature of the intake charge around TDC advances the start of combustion. Accordingly, the start of combustion can be controlled by controlling the pressure differential across the intake valve 32.

Figure 2:
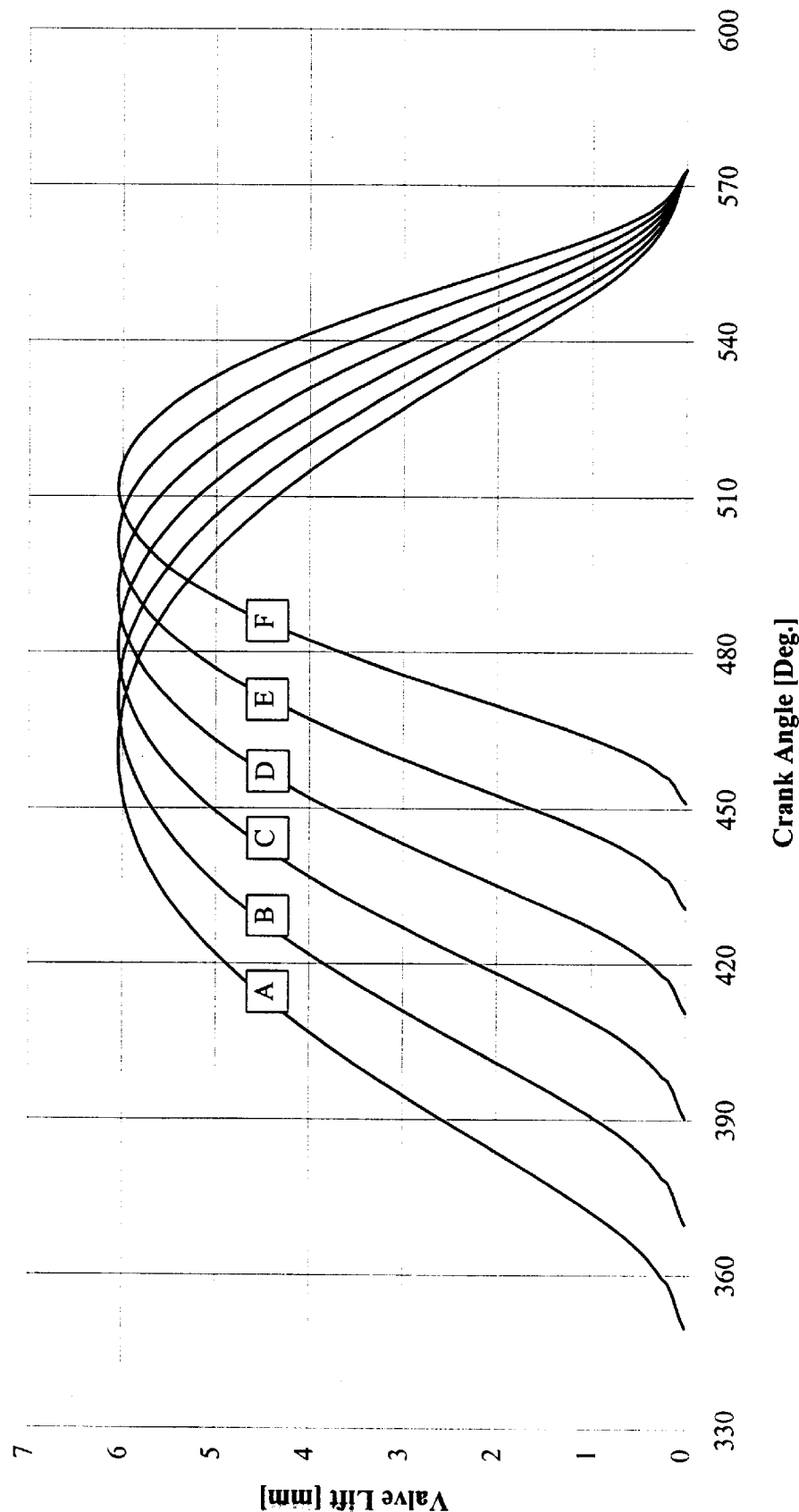
FIG. 2 is a graph of intake valve lift versus crank angle.

According to one arrangement of the ignition control system, the pressure differential across the intake valve is controlled by delaying the opening of the intake valve 32 after top-dead-center (TDC) of the exhaust stroke. The opening of the intake valve 32 at this point will be referred to as IVO (Intake Valve Opening). FIG. 2 illustrates six exemplary intake valve lift curves (i.e., intake valve lift versus crank angle). These curves are labeled A–F. The crank angle for IVO for lift curves A–F are approximately 345 degrees (i.e. 15 degrees before TDC), 375 degrees (i.e., 15 degrees after TDC), 390 degrees, 405 degrees, 435 degrees and 450 degrees, respectively. In the illustrated arrangement, each of the lift curves A–F close at the same crank angle (i.e., IVC) and have the same maximum lift (i.e., 6 millimeters). Accordingly, as the valve 32 opens, the derivative of the lift curve with respect to crank angle is generally greater for lift curve F as compared to lift curve A. Moreover, as the valve 32 closes, the derivative of the lift curve with respect to crank angle is generally greater (absolute value) for lift curve F as compared to lift curve A.

Figure 3:
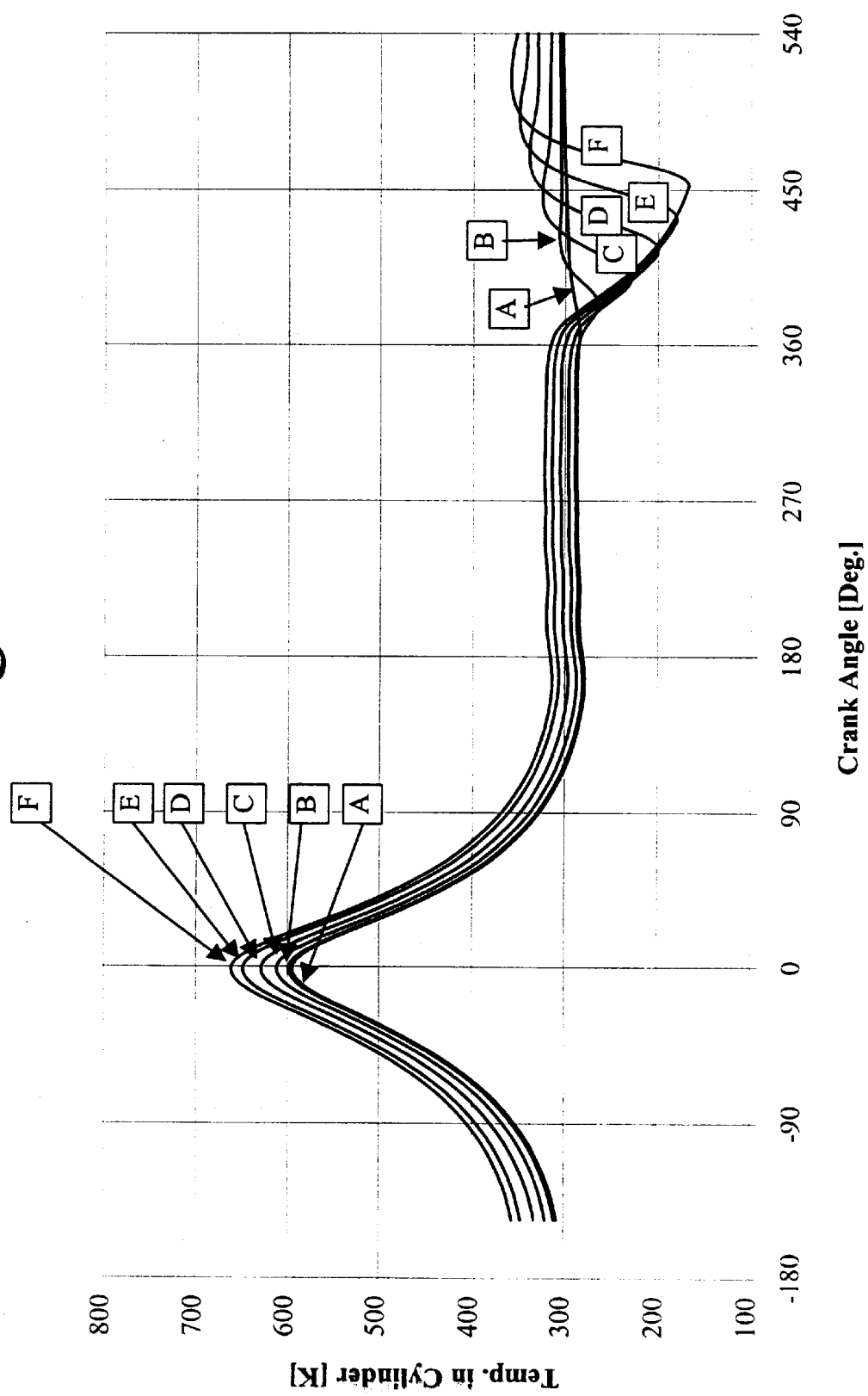
FIG. 3 is a graph of the temperature in the combustion chamber versus crank angle.

FIG. 3 illustrates the temperature in the combustion chamber 20 as a function of crank angle for each of the lift curves illustrated in FIG. 2. That is, the curves with similar designations correspond to each other. These curves represent numerical calculations of the temperature in the combustion chamber during the compression stroke without the effects of combustion.

As shown in FIG. 3, as IVO is delayed (moving from lift curve A to lift curve F), the temperature at TDC of the compression stroke (i.e., 0 degrees) is increased. For example, the temperature at TDC for lift curve F is greater than lift curve E. As explained above, this increase in temperature is caused primarily by the increased pressure differential across the intake valve when the intake passage 28 is in communication with the combustion chamber 20. Specifically, after TDC of the exhaust stroke, the exhaust valve is typically closed. As the piston 16 moves downward, the pressure in the combustion chamber 20 decreases due to the increasing volume of the combustion chamber 20. Thus, the pressure within the combustion chamber 20 becomes lower than the pressure in the intake passage 28. As IVO is delayed, the pressure differential between the combustion chamber 20 and the intake passage 28 increases. The pressure differential across the intake valve 32 therefore can be controlled by delaying IVO. Moreover, increasing the pressure differential across the intake valve 32, increases temperature near TDC of the compression stroke. Thus, the start of combustion can be advanced by delaying IVO and the start of combustion can be delayed by advancing IVO.

Figure 4:
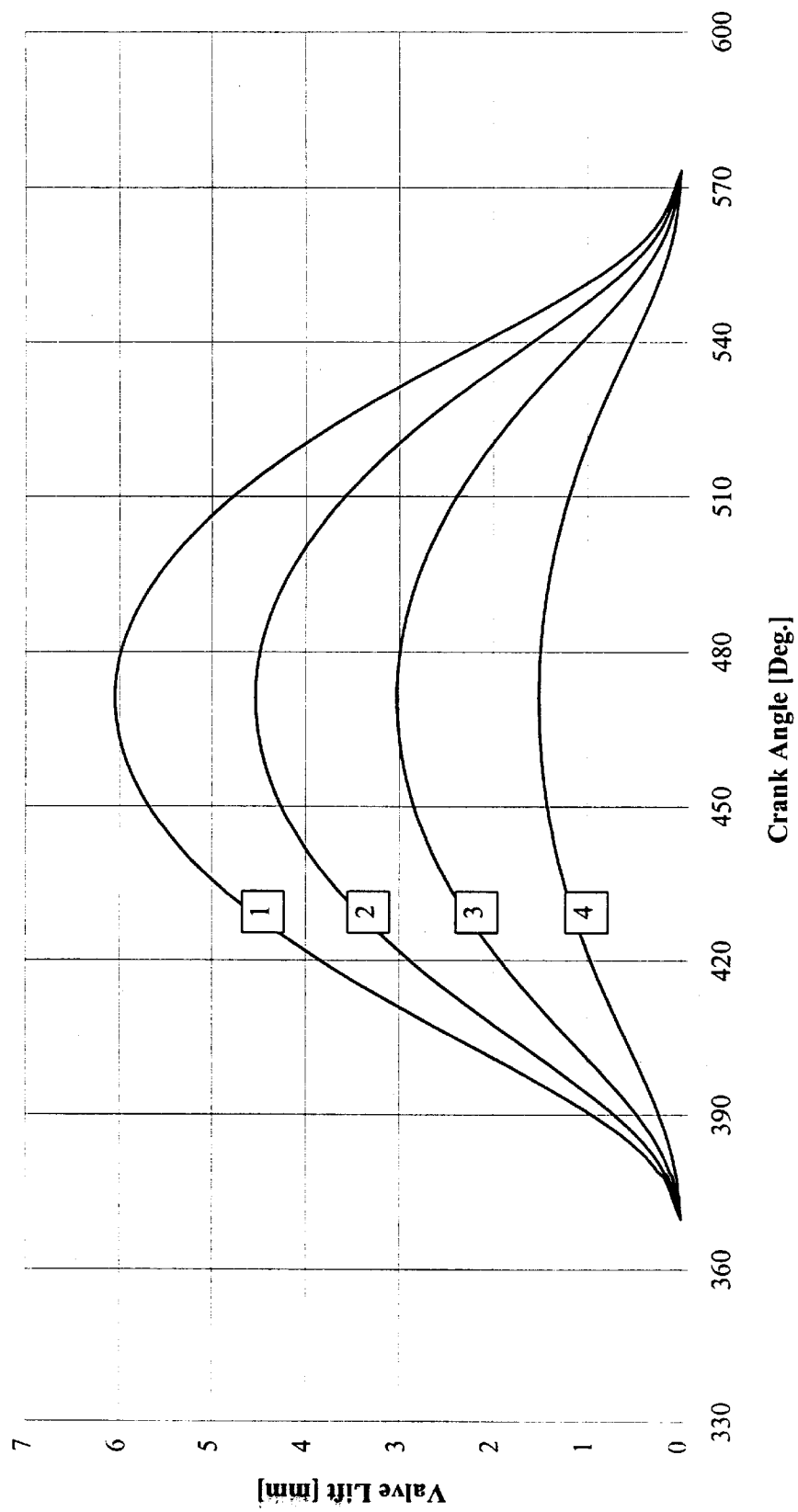
FIG. 4 is another graph of intake valve lift versus crank angle.

According to a modified arrangement of ignition control system, the pressure differential across the intake valve 32 is controlled by adjusting the maximum lift of the intake valve. The maximum lift of the intake valve 32 will be referred to as MAXIVL (Maximum Intake Valve Lift). FIG. 4 illustrates four exemplary intake valve lift curves, which are labeled 1–4, respectively. The MAXIVL for lift curves 1–4 are approximately 6.0, 4.5, 3.0 and 1.5 millimeters, respectively. In the illustrated arrangement, the crank angle for IVO and IVC are the same for each curve.

Figure 5:
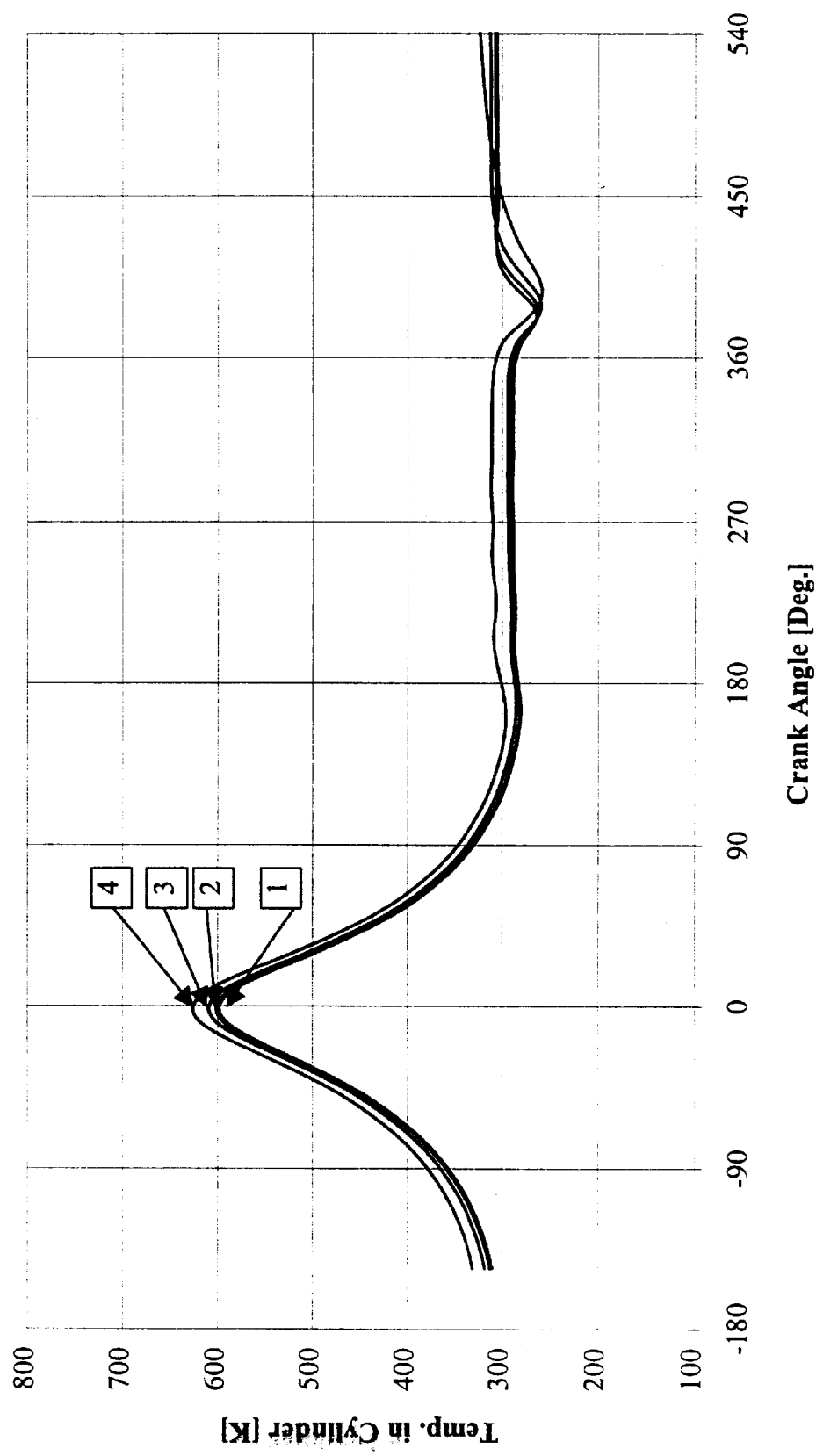
FIG. 5 is another graph of the temperature in the combustion chamber versus crank angle.

Similar to FIG. 3, FIG. 5 illustrates the temperature in the combustion chamber 20 as a function of crank angle for the lift curves of FIG. 4. The curves with similar designations in FIGS. 4 and 5 correspond to each other. Each lift curve produces a unique time-temperature history in the combustion chamber 20. Notably, the lift curves with smaller MAXIVL produce higher temperatures at TDC of the compression stroke. As explained above, the higher temperatures are caused by the increased pressure differential across the intake valve. Specifically, after TDC during the intake stroke, the pressure in the combustion chamber decreases as the piston 16 moves downward due to the increasing volume of the combustion chamber 20. If MAXIVL is small, the pressure decrease in the combustion chamber is greater because less intake charge flows into the combustion chamber. The pressure differential across the intake valve 32 increases with decreasing MAXIVL. Accordingly, the temperature in the combustion chamber 20 at TDC thus can be controlled by adjusting MAXIVL.

According to another arrangement of the ignition control system, the pressure differential across the intake valve 32 is controlled by adjusting IVO and by adjusting MAXIVL. By combining the effects of IVO and MAXIVL on the pressure differential, finer adjustments can be made to the pressure differential.

Figure 6:
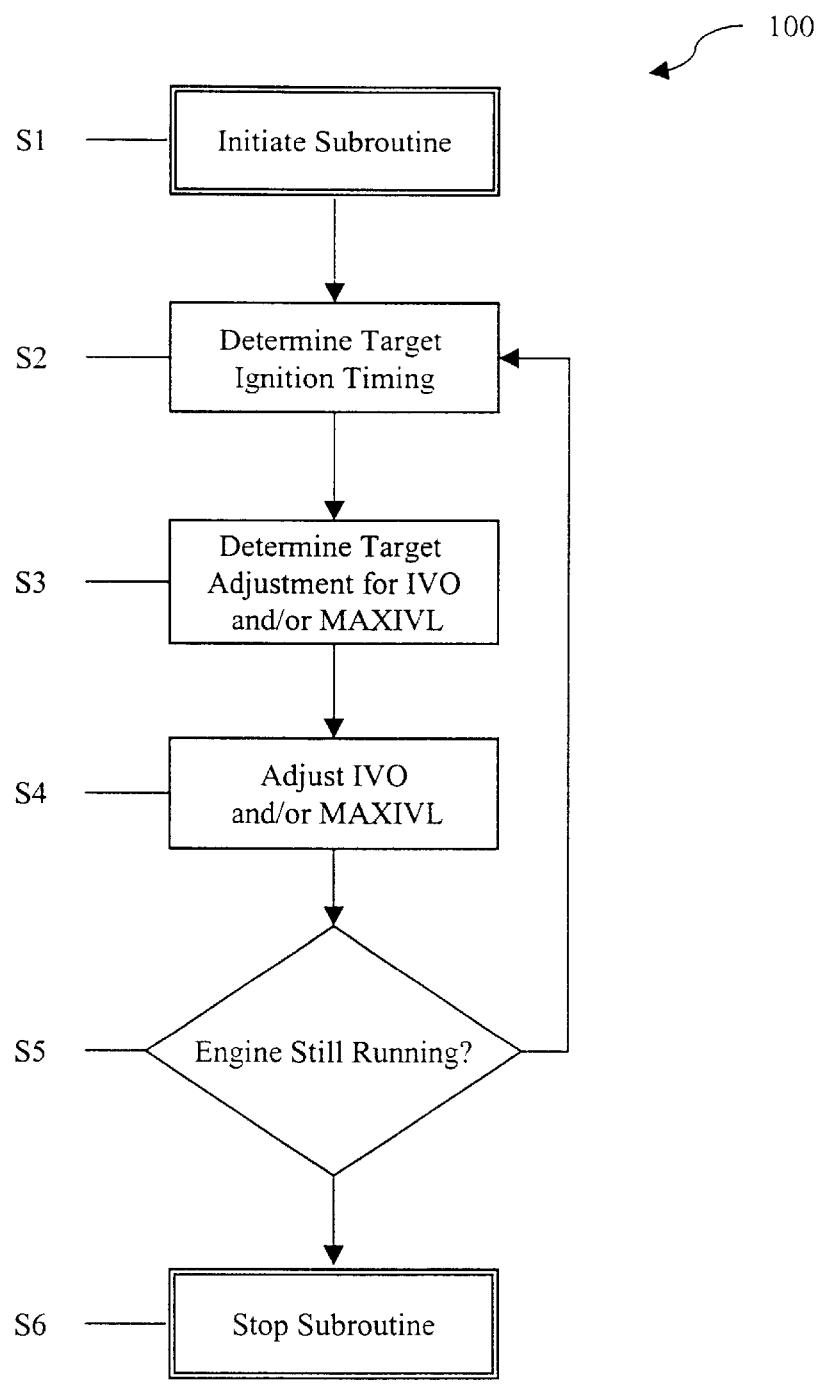
FIG. 6 is flow diagram of an ignition control system subroutine that can be performed by the ECU illustrated in FIG. 1.

FIG. 6 illustrates a subroutine 100 which can be executed by the ECU 38 of the ignition control system to control the ignition timing of the engine 10. As represented by operational block S1, the ignition control system initializes. Preferably, the subroutine 100 initializes when an ignition starting device (e.g., a key activated switch) is activated.

As represented by operational block S2, the ignition control system, once running, determines the target ignition timing (i.e., the target time for the start of combustion during a combustion stroke). This can be done by referring to control maps and/or indices stored within the ECU 38. In modified arrangement, the start of combustion can be determined by collecting data from various sensors and comparing that data to a control map and/or indices stored within the memory of the ECU 38. For example, it is desirable to advance ignition timing as engine RPM is increased because the duration under which the temperature of the intake charge is kept high becomes shorter. Accordingly, the output shaft sensor 60 can be used possibly in addition to other engine parameters to determine engine speed and the engine speed can be used with control map to determine that the ignition timing should be advanced as the engine RPM increases. In a similar manner, the ignition timing is desirably advanced with increasing engine load, which can be determined form the output shaft sensor 60 and the throttle position sensor 72 as described above.

After the ignition timing is determined, the ignition control system determines the target adjustments to be made to the IVO and/or to the MAXIVL to achieve the target ignition timing (operational block S3). This can be done by referring to control maps and/or indices stored within the ECU 38 that indicate the target IVO and/or MAXIVL to achieve the target ignition timing. The target adjustments to the IVO and/or to the MAXIVL can also be determined by collecting data from various sensors and comparing that data to control maps stored within the ECU 38. More specifically, ignition timing strongly depends upon the temperature in the combustion chamber 20 around TDC. As mentioned above, the temperature in the combustion chamber 20 can be adjusted by adjusting the pressure differential across the intake valve 32. However, the temperature in the combustion chamber 20 can also depend, at least in part, upon the coolant temperature, the lubricant temperature, the intake air temperature, the intake air pressure and/or the load of the engine. Accordingly, the data collected from the water temperature sensor 62, the lubricant temperature sensor 66, the air temperature sensor 72, the intake air pressure 70, the output shaft sensor 60 and/or the throttle position sensor 74 can be used with control maps to determine the target adjustments to IVO and/or to the MAXIVL.

After the ignition control system determines the target adjustments for the IVO and/or MAXIVL, the ignition control system adjusts the IVO and/or MAXIVL as represented by operational block S4. As represented by decisional block S5, the ignition control system repeats operational blocks S2–S4 as longs as the engine is running. When the engine 10 stops running, the ignition control system stops as represented by operational block S6. It should be appreciated that the subroutine described above can be performed every combustion cycle or every given number of cycles. It should also be noted that the subroutine can be modified such that some of the operational and/or decisional blocks are performed more frequently than the other operational and/or decisional blocks.

Figure 7:
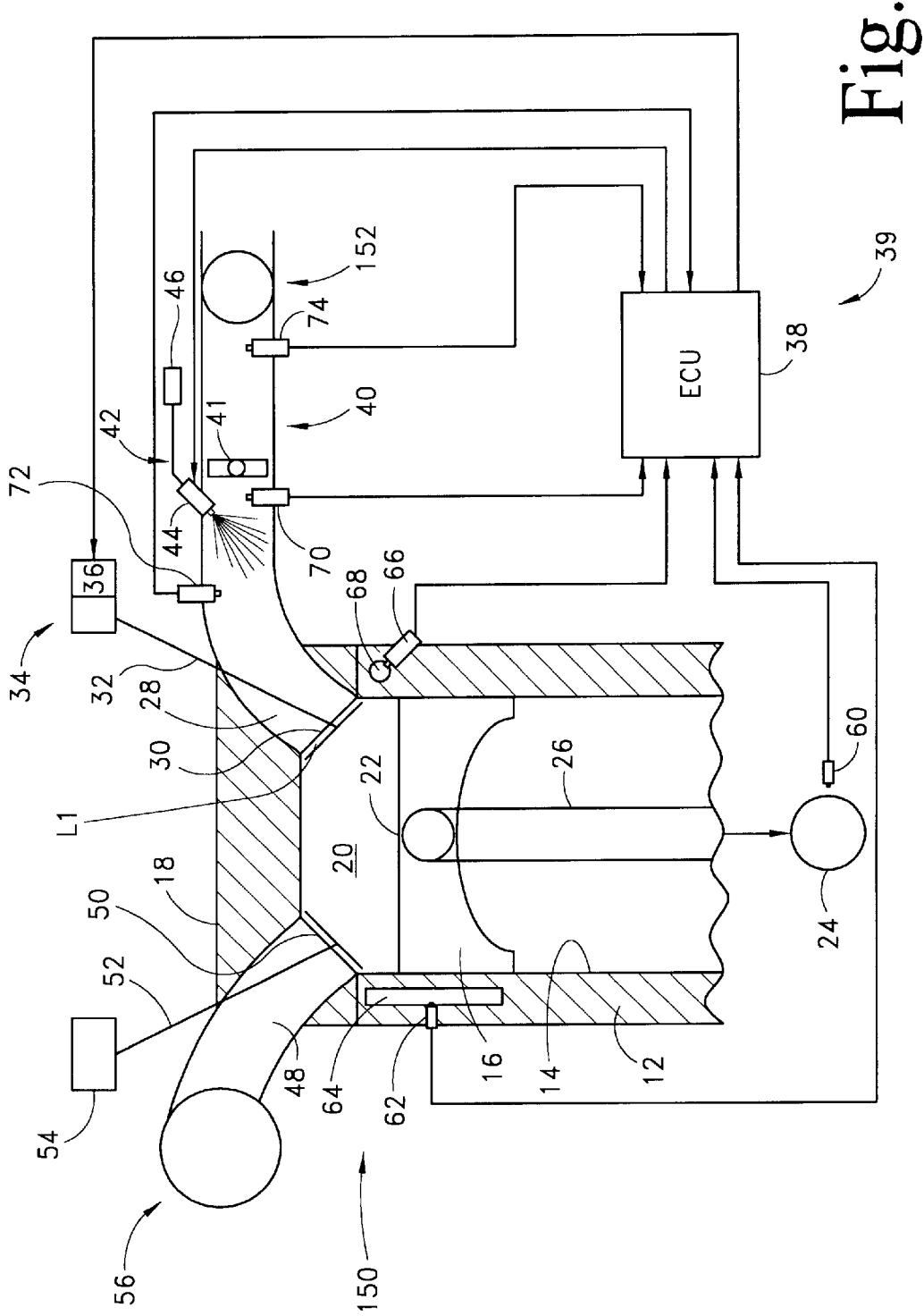
FIG. 7 is a schematic representation of a modified arrangement of an engine having certain features and advantages according to the present invention.

FIG. 7 is a schematic illustration of a modified arrangement of a homogeneous charge compression engine (HCCI) 150 having certain features and advantages according to the present invention. This modified arrangement is similar to the arrangement described below. The main difference is that the engine 150 of FIG. 10 includes a charger, which is illustrated schematically and referenced generally by the reference number 152. The charger 152 is a turbocharger or a supercharger that is configured to increase the pressure of the intake charge. As is well known in the art, increasing the pressure of the intake charge increases the power output of an engine. However, the higher engine load tends to increase the temperature of the combustion chamber. This can cause the ignition timing of the engine 150 to drift. To prevent the ignition timing from drifting, the engine includes an ignition control system as described above particular, the ignition timing control is configured to adjust the IVO and/or MAX-IVL in response to the pressured measured by the intake air pressure sensor 70. Accordingly, as the charger 152 increases the intake air pressure, the ignition control system can adjust IVO and/or MAXIVL to prevent the ignition timing from drifting.

Figure 8:
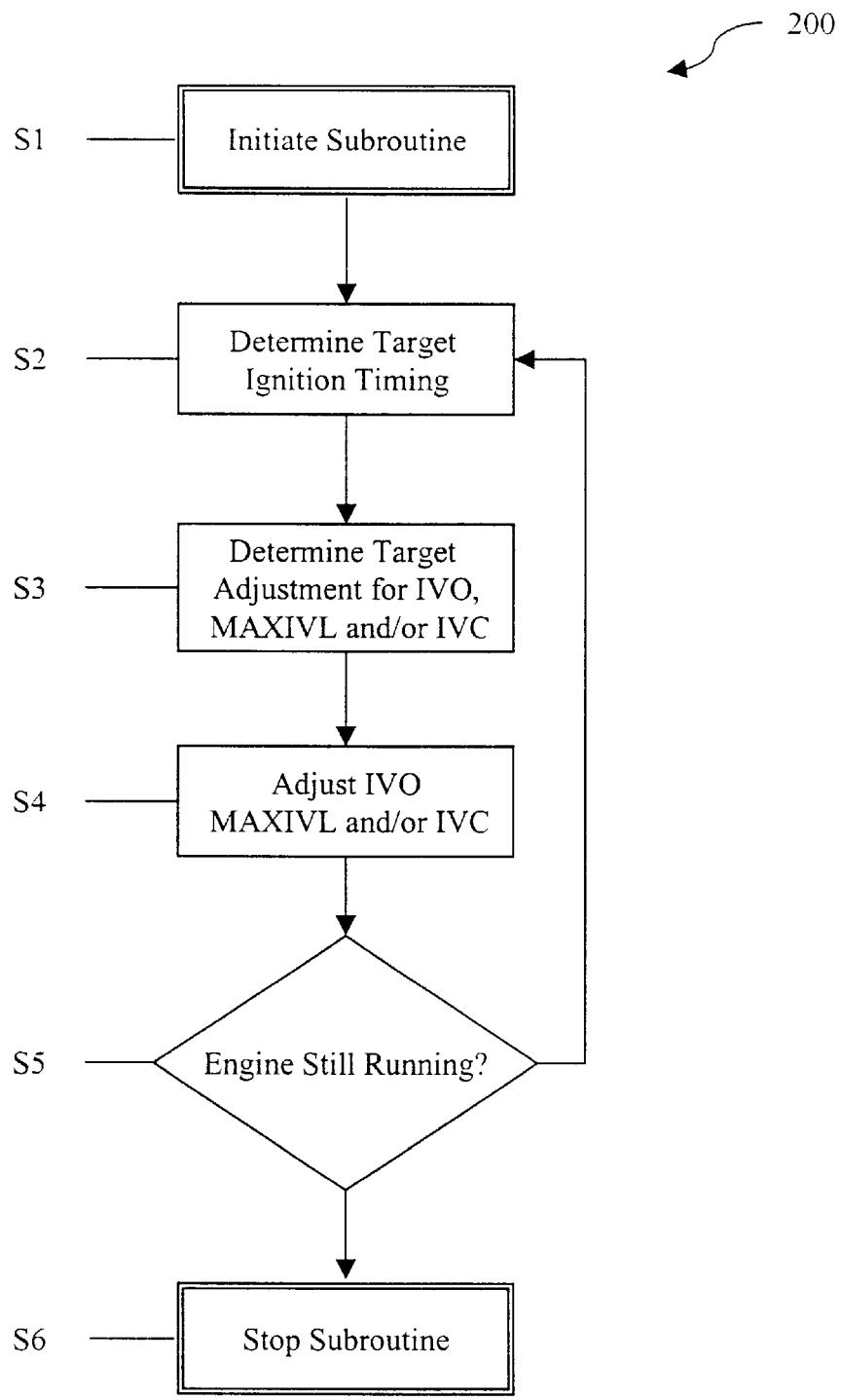
FIG. 8 is another flow diagram of an ignition control system subroutine that can be used by the ECU illustrated in FIG. 1.

According to another modified arrangement of the present invention, the compression ratio of the HCCI engine 10 can be adjusted by adjusting when the intake valve 32 closes (i.e., IVC). Specifically, the compression ratio is largest when IVC occurs near bottom dead center (BDC) of the intake stroke. The compression ratio decreases as IVC is delayed into the compression stroke past BDC of the intake stroke. Decreasing the compression ratio, tends to decrease the temperature of the combustion chamber 20 around TDC of the compression stroke. Accordingly, as shown in FIG. 8, the ignition control system can utilized a subroutine 200 that also adjusts IVC in addition to IVO and MAXIVL to further control the temperature around TDC of the compression stroke. As with FIG. 6, it should be appreciated that the subroutine of FIG. 8 can be performed every combustion cycle or every given number of cycles. It should also be noted that the subroutine can be modified such that some of the operational and/or decisional blocks are performed more frequently than the other operational and/or decisional blocks.

Figure 9:
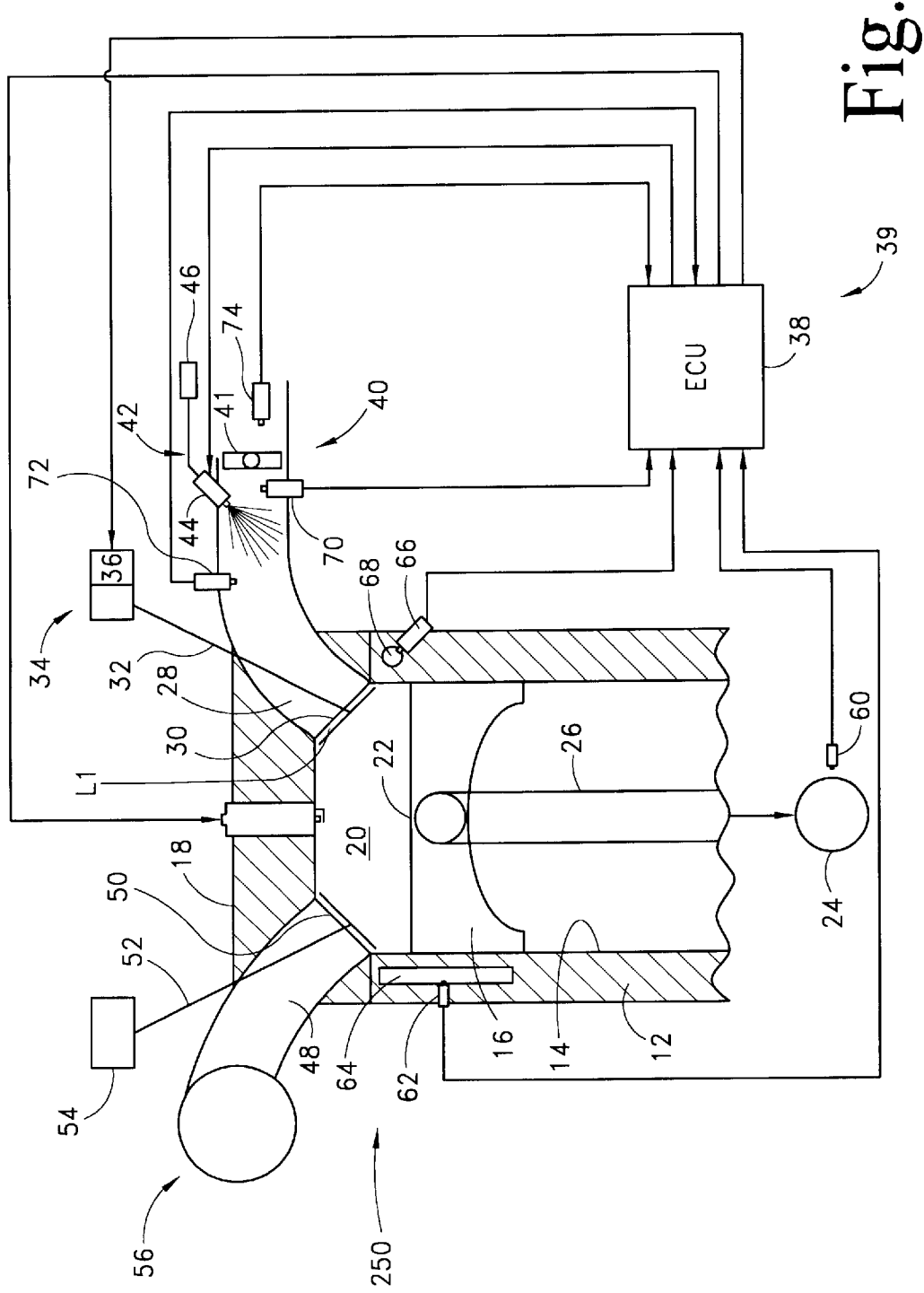
FIG. 9 is a schematic representation of yet another modified arrangement of an engine having certain features and advantages according to the present invention.

At high engine loads, it typically becomes difficult to operate HCCI engines because of knocking. Accordingly, FIG. 9 is a schematic illustration of a modified arrangement of a homogeneous charge compression engine (HCCI) 250 that includes a spark plug 252. The engine 250, therefore, can be operated in an spark-ignition mode during high loads and in a HCCI mode during moderate and low loads. During spark-ignition, the compression ratio of the engine 250 needs to be lower than HCCI operation to prevent knocking. Accordingly, the engine control system is preferably configured to adjust IVC such that the compression ratio is lower at high loads. IVO and/or MAXIVL can also be used to adjust the temperature in the combustion chamber to prevent knocking. During HCCI operation, the engine control system preferably increases the compression ratio of the engine by adjusting the IVC, and the IVO and/or MAXIVL can be adjusted as described above to control ignition timing.

For purposes of describing the invention and the advantages achieved over the prior art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Moreover, although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A method for operating an internal combustion engine comprising at least one combustion chamber formed by at least a first member and a second member that moves relative to the first member, the second member being coupled to an output shaft such that movement of the second member causes the output shaft to rotate, an intake port that is in communication with the combustion chamber and an intake passage and is opened and closed by an intake valve that is actuated by a valve actuating system, a fuel supply system and air supply system configured to provide a substantially homogeneous air/fuel charge, which is comprised of mixed fuel and air, to the combustion chamber, and a control system configured to control the valve actuating system, the method comprising:

forming a substantially homogenous air/fuel charge;

introducing at least the air of the air/fuel charge into the combustion chamber through the intake port;

advancing the auto ignition of the air/fuel charge by increasing a pressure differential between the intake port and the combustion chamber when the intake passage is in communication with the combustion chamber;

compressing the air/fuel charge; and auto-igniting the air/fuel charge due to the compression of the air/fuel charge.

2. The method described in claim 1, wherein adjusting the pressure differential between the intake port and the combustion chamber includes adjusting when the intake valve opens.

3. The method described in claim 1, wherein adjusting the pressure differential between the intake port and the combustion chamber a further includes adjusting a maximum lift of the intake valve.

4. The method described in claim 3, wherein adjusting the pressure differential between the intake port and the combustion chamber includes adjusting when the intake valve opens.

5. The method described in claim 1 further comprising determining an auto-ignite time.

6. The method described in claim 5, wherein determining an auto-ignite time involves sensing engine speed.

7. The method described in claim 5, wherein adjusting the pressure differential between the intake port and the combustion chamber includes adjusting when the intake valve opens.

8. The method described in claim 5, wherein adjusting the pressure differential between the intake port and the combustion chamber a further includes adjusting a maximum lift of the intake valve.

9. The method described in claim 8, wherein adjusting the pressure differential between the intake port and the combustion chamber includes adjusting when the intake valve opens.

10. The method described in claim 1, further comprising determining a target pressure differential between the intake port and the combustion chamber.

11. The method described in claim 10, wherein determining a target pressure differential involves sensing at least one engine running parameter.

12. The method described in claim 11, wherein determining a target pressure differential involves sensing at least one of a group of engine running parameters consisting of an intake air temperature, an intake air pressure, an engine coolant temperature, engine lubricant temperature, an engine speed, and an intake air throttle position.

13. The method described in claim 10, wherein adjusting the pressure differential between the intake port and the combustion chamber includes adjusting when the intake valve opens.

14. The method described in claim 10, wherein adjusting the pressure differential between the intake port and the combustion chamber a further includes adjusting a maximum lift of the intake valve.

15. The method described in claim 14, wherein adjusting the pressure differential between the intake port and the combustion chamber includes adjusting when the intake valve opens.

16. The method described in claim 10, wherein determining a target pressure differential involves sensing an intake air pressure downstream of a charger of the induction system which increases the pressure of the air of the air/fuel charge.

17. The method described in claim 1, wherein controlling when the air/fuel charge auto-ignites comprises adjusting a compression ratio of the internal combustion engine.

18. The method described in claim 17, wherein adjusting the compression ratio of the internal combustion engine comprises adjusting when the intake valve closes.

19. The method described in claim 17, wherein adjusting the pressure differential between the intake port and the combustion chamber includes adjusting when the intake valve opens.

20. The method described in claim 17, wherein adjusting the pressure differential between the intake port and the combustion chamber a further includes adjusting a maximum lift of the intake valve.

21. The method described in claim 20, wherein adjusting the pressure differential between the intake port and the combustion chamber includes adjusting when the intake valve opens.

22. The method of claim 1, wherein controlling when the air/fuel charge auto-ignites and auto-igniting the air/fuel charge occurs when said engine is operating at a low load.

23. The method described in claim 22, wherein adjusting the pressure differential between the intake port and the combustion chamber includes adjusting when the intake valve opens.

24. The method described in claim 22, wherein adjusting the pressure differential between the intake port and the combustion chamber a further includes adjusting a maximum lift of the intake valve.

25. The method described in claim 24, wherein adjusting the pressure differential between the intake port and the combustion chamber includes adjusting when the intake valve opens.

26. The method of claim 22, further comprising igniting the air/fuel charge with a spark plug when said engine is operating at a load greater than said low load.

27. The method described in claim 26, wherein adjusting the pressure differential between the intake port and the combustion chamber includes adjusting when the intake valve opens.

28. The method described in claim 26, wherein adjusting the pressure differential between the intake port and the combustion chamber a further includes adjusting a maximum lift of the intake valve.

29. The method described in claim 28, wherein adjusting the pressure differential between the intake port and the combustion chamber includes adjusting when the intake valve opens.

30. The method described in claim 1, wherein forming a substantially homogeneous air/fuel charge occurs within said combustion chamber.

31. The method described in claim 1, wherein forming a substantially homogeneous air/fuel charge occurs within said intake passage.

32. The method described in claim 1, wherein forming a substantially homogeneous air/fuel charge occurs within said air supply system upstream of said intake passage.

33. The method described in claim 1 additionally comprising retarding the auto-ignition of the air/fuel charge by decreasing the pressure differential.

34. A method for operating an internal combustion engine comprising at least one combustion chamber formed by at least a first member and a second member that moves relative to the first member, the second member being coupled to an output shaft such that movement of the second member causes the output shaft to rotate, an intake port that is in communication with the combustion chamber and an intake passage and is opened and closed by an intake valve that is actuated by a valve actuating system, a fuel supply system and air supply system configured to provide a substantially homogeneous air/fuel charge, which is comprised of mixed fuel and air, to the combustion chamber, and a control system configured to control the valve actuating system, the method comprising:

forming a substantially homogenous air/fuel charge;

introducing at least the air of the air/fuel charge into the combustion chamber through the intake port;

controlling when the air/fuel charge auto-ignites by adjusting a pressure differential between the intake port and the combustion chamber when the intake passage is in communication with the combustion chamber;

compressing the air/fuel charge;

auto-igniting the air/fuel charge due to the compression of the air/fuel charge, further comprising; and determining a target pressure differential between the intake port and the combustion chamber, wherein determining a target pressure differential involves sensing an intake air pressure downstream of a charger of the induction system which increases the pressure of the air of the air/fuel charge and wherein adjusting the pressure differential between the intake port and the combustion chamber includes adjusting when the intake valve opens.

35. A method for operating an internal combustion engine comprising at least one combustion chamber formed by at least a first member and a second member that moves relative to the first member, the second member being coupled to an output shaft such that movement of the second member causes the output shaft to rotate, an intake port that is in communication with the combustion chamber and an intake passage and is opened and closed by an intake valve that is actuated by a valve actuating system, a fuel supply system and air supply system configured to provide a substantially homogeneous air/fuel charge, which is comprised of mixed fuel and air, to the combustion chamber, and a control system configured to control the valve actuating system, the method comprising:

forming a substantially homogenous air/fuel charge;

introducing at least the air of the air/fuel charge into the combustion chamber through the intake port;

controlling when the air/fuel charge auto-ignites by adjusting a pressure differential between the intake port and the combustion chamber when the intake passage is in communication with the combustion chamber;

compressing the air/fuel charge;

auto-igniting the air/fuel charge due to the compression of the air/fuel charge, further comprising; and determining a target pressure differential between the intake port and the combustion chamber, wherein determining a target pressure differential involves sensing an intake air pressure downstream of a charger of the induction system which increases the pressure of the air of the air/fuel charge and wherein adjusting the pressure differential between the intake port and the combustion chamber a further includes adjusting a maximum lift of the intake valve.

36. The method described in claim 35, wherein adjusting the pressure differential between the intake port and the combustion chamber includes adjusting when the intake valve opens.

37. An internal combustion engine comprising at least one combustion chamber formed by at least a first member and a second member that moves relative to the first member, the second member being coupled to an output shaft such that movement of the second member causes the output shaft to rotate, an intake port that is in communication with the combustion chamber and is opened and closed by an intake valve that is actuated by a valve actuating system, a fuel supply system and air supply system configured to provide a substantially homogeneous air/fuel charge, which is comprised of mixed fuel and air, to the combustion chamber, and a control system configured to control the valve actuating system, and means for advancing when the air/fuel charge auto-ignites due to compression in the combustion chamber by increasing a pressure differential between the intake port and the combustion chamber when the intake port is open.

38. The internal combustion engine as in claim 37, further comprising a spark plug in communication with the combustion chamber and wherein said control system is further configured to ignite the air/fuel charge with said spark plug at high loads and to auto-ignite the air/fuel charge by compression during low loads.

39. The internal combustion engine as in claim 37 additionally comprising means for retarding the auto ignition of the air/fuel charge by decreasing the pressure differential.

40. An internal combustion engine comprising at least one combustion chamber formed by at least a first member and a second member that moves relative to the first member, the second member being coupled to an output shaft such that movement of the second member causes the output shaft to rotate, an intake port that is in communication with the combustion chamber and an intake passage and is opened and closed by an intake valve that is actuated by a valve actuating system, a fuel supply system and air supply system configured to provide a substantially homogeneous air/fuel charge, which is comprised of mixed fuel and air, to the combustion chamber, and a control system configured to control the valve actuating system and furthered configured to advance when the air/fuel charge auto-ignites by increasing a pressure differential between the intake port and the combustion chamber when the intake passage is in communication with the combustion chamber.

41. The internal combustion engine of claim 40, wherein said control system is further configured to control when said air/fuel charge auto-ignites by adjusting when the intake valve opens.

42. The internal combustion engine of claim 40, wherein said control system is further configured to control when said air/fuel charge auto-ignites by adjusting a maximum lift of the intake valve.

43. The internal combustion engine of claim 42, wherein said control system is further configured to control when said air/fuel charge auto-ignites by also adjusting when the intake valve opens.

44. The internal combustion engine of claim 40, wherein said control system is also configured to determine a target auto-ignite time.

45. The internal combustion engine of claim 44, wherein said control system is configured to determine said auto-ignite time by sensing engine speed.

46. The internal combustion engine of claim 44, wherein said control system is further configured to control when said air/fuel charge auto-ignites by adjusting when the intake valve opens.

47. The internal combustion engine of claim 44, wherein said control system is further configured to control when said air/fuel charge auto-ignites by adjusting a maximum lift of the intake valve.

48. The internal combustion engine of claim 47, wherein said control system is further configured to control when said air/fuel charge auto-ignites by also adjusting when the intake valve opens.

49. The internal combustion engine of claim 40, wherein said control system is also configured to determine a target pressure differential between the intake port and the combustion chamber.

50. The internal combustion engine of claim 49, wherein said control system is configured to determine said target pressure differential by sensing at least one engine running parameter.

51. The internal combustion engine of claim 50, wherein said control system is configured to determine a target pressure differential by sensing at least one of a group of engine running parameters consisting of an intake air temperature, an intake air pressure, an engine coolant temperature, engine lubricant temperature, an engine speed, and an intake air throttle position.

52. The internal combustion engine of claim 49, wherein said control system is further configured to control when said air/fuel charge auto-ignites by adjusting when the intake valve opens.

53. The internal combustion engine of claim 49, wherein said control system is further configured to control when said air/fuel charge auto-ignites by adjusting a maximum lift of the intake valve.

54. The internal combustion engine of claim 53, wherein said control system is further configured to control when said air/fuel charge auto-ignites by also adjusting when the intake valve opens.

55. The internal combustion engine of claim 49, wherein said induction system includes a charger to increase the pressure of the air of the air/fuel charge and said control system is configured to determine a target pressure differential by sensing an intake air charge pressure downstream of a charger of the induction system which increases the pressure of the air of the air/fuel charge.

56. The internal combustion engine of claim 40, wherein said control system is configured to control when the air/fuel charge auto-ignites by at least in part adjusting a compression ratio of the internal combustion engine.

57. The internal combustion engine of claim 56, wherein said control system is configured to adjust the compression ratio of the internal combustion engine by at least in part adjusting when the intake valve closes.

58. The internal combustion engine of claim 56, wherein said control system is further configured to control when said air/fuel charge auto-ignites by adjusting when the intake valve opens.

59. The internal combustion engine of claim 56, wherein said control system is further configured to control when said air/fuel charge auto-ignites by adjusting a maximum lift of the intake valve.

60. The internal combustion engine of claim 59, wherein said control system is further configured to control when said air/fuel charge auto-ignites by also adjusting when the intake valve opens.

61. The internal combustion engine of claim 40, wherein said control system is configured to auto ignite said air/fuel charge when said engine is operating at a low load.

62. The internal combustion engine of claim 61, wherein said control system is further configured to control when said air/fuel charge auto-ignites by adjusting when the intake valve opens.

63. The internal combustion engine of claim 61, wherein said control system is further configured to control when said air/fuel charge auto-ignites by adjusting a maximum lift of the intake valve.

64. The internal combustion engine of claim 63, wherein said control system is further configured to control when said air/fuel charge auto-ignites by also adjusting when the intake valve opens.

65. The internal combustion engine of claim 61, wherein said control system is also configured to ignite said air/fuel charge with a spark plug when said engine is operating at a load greater than said low load.

66. The internal combustion engine of claim 65, wherein said control system is further configured to control when said air/fuel charge auto-ignites by adjusting when the intake valve opens.

67. The internal combustion engine of claim 65, wherein said control system is further configured to control when said air/fuel charge auto-ignites by adjusting a maximum lift of the intake valve.

68. The internal combustion engine of claim 67, wherein said control system is further configured to control when said air/fuel charge auto-ignites by also adjusting when the intake valve opens.

69. The method described in claim 40, wherein said fuel supply system and said air supply system is configured to form said substantially homogeneous air/fuel charge within said combustion chamber.

70. The method described in claim 40, wherein said fuel supply system and said air supply system are configured to form said substantially homogeneous air/fuel charge within said intake passage.

71. The method described in claim 40, wherein said fuel supply system and said air supply system are configured to form said substantially homogeneous air/fuel charge within said air supply system upstream of said intake passage.

72. The internal combustion engine of claim 40, wherein the control system is further configured to retard the timing of the auto ignition by reducing the pressure differential.

73. An internal combustion engine comprising at least one combustion chamber formed by at least a first member and a second member that moves relative to the first member, the second member being coupled to an output shaft such that movement of the second member causes the output shaft to rotate, an intake port that is in communication with the combustion chamber and an intake passage and is opened and closed by an intake valve that is actuated by a valve actuating system, a fuel supply system and air supply system configured to provide a substantially homogeneous air/fuel charge, which is comprised of mixed fuel and air, to the combustion chamber, and a control system configured to control the valve actuating system and furthered configured to control when the air/fuel charge auto-ignites by adjusting a pressure differential between the intake port and the combustion chamber when the intake passage is in communication with the combustion chamber wherein said induction system includes a charger to increase the pressure of the air of the air/fuel charge and said control system is configured to determine a target pressure differential by sensing an intake air charge pressure downstream of a charger of the induction system which increases the pressure of the air of the air/fuel charge and wherein said control system is further configured to control when said air/fuel charge auto-ignites by adjusting when the intake valve opens.

74. An internal combustion engine comprising at least one combustion chamber formed by at least a first member and a second member that moves relative to the first member, the second member being coupled to an output shaft such that movement of the second member causes the output shaft to rotate, an intake port that is in communication with the combustion chamber and an intake passage and is opened and closed by an intake valve that is actuated by a valve actuating system, a fuel supply system and air supply system configured to provide a substantially homogeneous air/fuel charge, which is comprised of mixed fuel and air, to the combustion chamber, and a control system configured to control the valve actuating system and furthered configured to control when the air/fuel charge auto-ignites by adjusting a pressure differential between the intake port and the combustion chamber when the intake passage is in communication with the combustion chamber wherein said induction system includes a charger to increase the pressure of the air of the air/fuel charge and said control system is configured to determine a target pressure differential by sensing an intake air charge pressure downstream of a charger of the induction system which increases the pressure of the air of the air/fuel charge and wherein said control system is further configured to control when said air/fuel charge auto-ignites by adjusting a maximum lift of the intake valve.

75. The internal combustion engine of claim 74, wherein said control system is further configured to control when said air/fuel charge auto-ignites by also adjusting when the intake valve opens.

\* \* \* \* \*